(No Model.)
A. A. LOW.
COMBINATION POCKET IMPLEMENT.
No. 464,138. Patented Dec. 1, 1891.
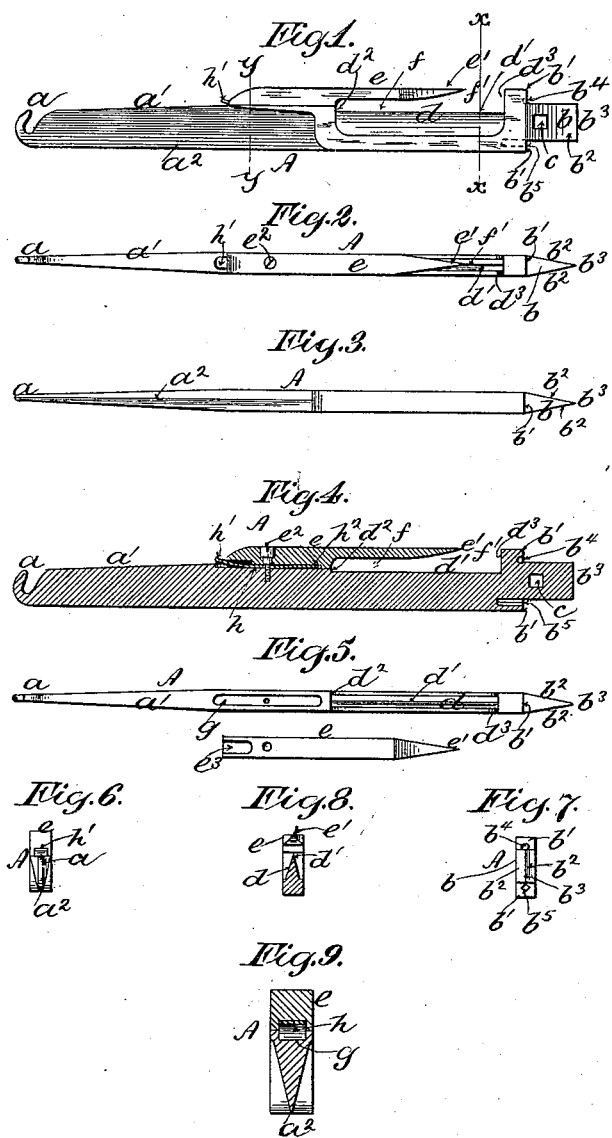
Witnesses:
D. W. Gardner
G. T. Miatt
Inventor:
Abbot Augustus Low.

UNITED STATES PATENT OFFICE.

ABBOT AUGUSTUS LOW, OF BROOKLYN, NEW YORK.

COMBINATION POCKET IMPLEMENT.

SPECIFICATION forming part of Letters Patent No. 464,138, dated December 1, 1891.

Application filed February 12, 1891. Serial No. 381,158. (No model.)

*To all whom it may concern:*

Be it known that I, ABBOT AUGUSTUS LOW, a citizen of the United States, residing in the city of Brooklyn, in the county of Kings and State of New York, have invented certain new and useful Improvements in Combination Implements, of which the following is a specification sufficient to enable others skilled in the art to which the invention appertains to make and use the same.

My improvements relate to implements adapted to the various ordinary requirements of every day use; and the device, in which various functions are embodied, is especially designed to be carried upon the person, although equally applicable for use as an ordinary tool while affording an aggregation of separate tools.

The invention consists, essentially, in the combination and arrangement, substantially as herein shown and described, of the several special devices in one implement, as fully set forth in the claims.

A leading feature of my present invention consists in forming the shank with a swinging guard for the inner cutting-blade, which guard is itself an implement adapted for use as a nail-cleaner and for analogous purposes. In this connection the invention includes the peculiar construction and arrangement of the parts for holding the guard parallel to the shank in either position. The guard may also be made of such length and so pivoted that when swung around away from the blade its point will project beyond the shank of the implement and be thereby adapted for use as a brad or awl, &c.

Another feature of my invention consists in forming in the shank, preferably in the end which is shaped as a wedge or screw-driver, a square or other suitably-shaped recess or socket to adapt the device for use as a wrench for special or general purposes.

My invention also includes certain other special features of construction and arrangement set forth in the following description and claims. For instance, special provision is made for using the implement as a handle for detachable tools by a socket formed for the reception of the shanks of such tools in the end of the implement adjoining the wedge, and special functions are provided for.

In the accompanying drawings I show a preferable form and construction of the several parts and of their relative arrangement and combination in a single implement, although certain modifications may be made therein without departing from the essential features of my invention.

Figure 1 is a side elevation; Fig. 2, an elevation of one edge, and Fig. 3 an elevation of the other edge, of the device. Fig. 4 is a longitudinal section; Fig. 5, an elevation of the edge on which the movable guard is situated, with the latter removed and turned over to show the groove in its under side. Fig. 6 is an elevation of the hook end of the device; Fig. 7, an end elevation of the screw-driver end of the device; Fig. 8, a transverse section upon plane of line $x\,x$, Fig. 1; Fig. 9, a transverse section, upon an enlarged scale, upon plane of line $y\,y$, Fig. 1.

In the drawings, the letter A indicates the shank or body of the implement, generally formed of a single piece of metal. One end of the shank is formed into a hook $a$, which may be used either as a button-hook or as a pull-hook for tightening shoe-strings, &c., or for any of the various uses to which button and other hooks are applied. What may be designated as the shank $a'$ of the button-hook extends for about one-half the length of the implement and is formed with a straight edge $a^2$, which is adapted for use as a paper-knife, envelope-opener, or ruler, the blade thus formed being preferably, though not necessarily, V-shaped in cross-section. The opposite end of the implement is formed with a wedge $b$, which is adapted for use as a screw-driver, the width of the wedge $b$ being slightly less than that of the body A of the implement, so as to leave rectangular shoulders $b'\,b'$ upon either side, which may be utilized as push-shoulders in forcing home pins, &c. The wedge is also made of a prescribed length, so that the sides $b^2\,b^2$, from the edge $b^3$ to the shoulders $b'\,b'$, constitute permanent gages.

A rectangular or other angular hole $c$ is formed in the shank A, preferably at the screw-driver end, as shown in the drawings, for use as a wrench, the size and shape of the socket thus formed being governed by the special work for which it may be designed.

The interior blade or cord-cutter $d$ is formed in the shank A, adjoining the wedge $b$, and preferably with its cutting-edge $d'$ facing in the opposite direction to that of the paper-cutter $a^2$. The blade $d'$ is virtually formed in a recess created in the thicker portion of the shank A, the ends of the blade ending against and being protected by the shoulders $d^2\ d^3$, between which, however, the edge $d'$ would be fully exposed were it not for the swinging guard $e$, which projects in front of it when closed in a parallel direction for the greater portion of the length of the blade. A slot $f$ is thus virtually formed between the guard $e$ and the edge $d'$ of the blade, with an entrance $f'$ between the point $e'$ of the guard and the shoulder $d^3$, the space $f'$ admitting of the entrance of cord, &c., to be severed by the edge $d'$ without exposing the latter to accidental extraneous objects. When the guard $e$ is closed, as shown in the drawings, its point $e'$ is also, being within the line of the shoulder $d^3$, largely protected thereby, while the space $f'$ admits of the convenient use of the point $e'$ as a nail-cleaner.

In order that the guard $e$ may be swung out of the way when it is desired to employ the sharp edge $d'$ of the blade $d$ for cutting in any of the various uses to which the blades of pocket-knives are applied, I pivot the said guard $e$ at $e^2$ to the edge of the shank A. The means for holding the guard $e$ parallel to the shank A in either the opened or closed positions are novel and effective, while avoiding all unevenness or protuberance.

A groove $g$ is formed in the edge of the shank A, in which a double spring $h$ is situated, both ends $h'\ h^2$ projecting, when free, slightly beyond the edges of the groove $g$. A corresponding groove $e^3$ is formed in the under side of the guard $e$ at its rear extremity, into which either one end or the other of the spring $h$ snaps when the guard is turned parallel to the shank in either one direction or the other, as the case may be.

The guard $e$ may be of such length and so pivoted to the shank A that when the guard is opened it will project outward beyond the hook $a$ a sufficient distance to permit of the point $e'$ being used as a brad, graver, burring-tool, or for other similar purpose, and the point $e'$ may be variously formed, as may be preferred, for special uses of this kind.

The blade $d$, instead of having a sharp straight knife-edge, may be formed with saw-teeth, or a file or other preferred form of tool may be substituted.

In the face of the shoulder $b'$ a slight recess or depression $b^4$ is formed, adapted to receive the head of a pin or similar article and to assist in holding and steadying it while it is being driven or forced forward into or through an article or articles. On the other side of the wedge in the shoulder $b'$ a socket $b^5$ is formed, of suitable size and depth to receive and hold by frictional contact the shanks of any of a series of interchangeable tools, such as gimlet-points, brads, gouges, cutting or etching tools, gravers, burrows, &c., the shank A being used as an ever-ready and convenient handle.

The wrench $c$, instead of being made closed, as shown, may be made in the form of an open wrench in the side of the wedge $b^2$. In any case it affords a convenient means for tightening the strings of musical instruments in tuning and like purposes.

What I claim as my invention, and desire to secure by Letters Patent, is—

1. In a combination implement substantially such as described, a single piece of metal formed into the shank A, hook $a$, exterior cutting-edge $a^2$, interior blade $d$, and wedge $b$, substantially in the manner and for the purpose set forth.

2. In a combination implement substantially such as described, a single piece of metal formed into the shank A, hook $a$ at one end, and the wedge $b$ and one or more shoulders $b'$ at the other, substantially in the manner and for the purpose described.

3. In a combination implement substantially such as described, a single piece of metal formed with the shank A, hook $a$ at one end, and wedge $b$ at the other, with the exterior cutting-blade $a^2$ on one side and the interior cutting-blade $d$ on the other, and with the wrench-hole $c$, adjoining the wedge $b$, substantially in the manner and for the purpose described.

4. In an implement substantially such as described, the combination, with the shank A, formed with the hook $a$, wedge $b$, and interior blade $d$, of the pivoted guard $e$, arranged and operating substantially in the manner and for the purpose set forth.

5. In an implement substantially such as described, the combination, with the shank A, formed with the hook $a$, wedge $b$, and interior blade $d$, of the pivot-guard $e$, formed with the point $e'$, for the purpose and substantially in the manner described.

6. In an implement substantially such as described, the shank A, formed with the interior blade $d$ and recess $g$, in combination with the pivot $e^2$, spring $h$, and guard $e$, formed with the recess $e^3$, substantially in the manner and for the purpose described.

7. In an implement substantially such as described, the shank A, formed with the hook $a$, wedge $b$, and shoulder $b'$, having the recess $b^4$, for the purpose and substantially in the manner described.

8. In an implement substantially such as described, the shank A, formed with the hook $a$ and wedge $b$, shoulder $b'$, and socket $b^5$, for the purpose and substantially in the manner described.

ABBOT AUGUSTUS LOW.

Witnesses:
D. W. GARDNER,
G. T. MIATT.